May 18, 1943. J. K. LUND 2,319,418
MIXING DEVICE FOR MIXING HOT AND COLD LIQUIDS
Filed July 8, 1939
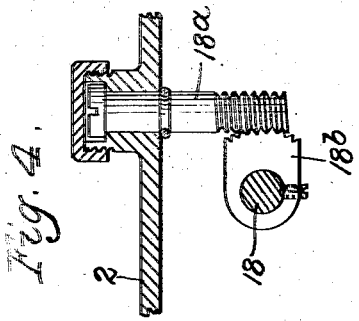
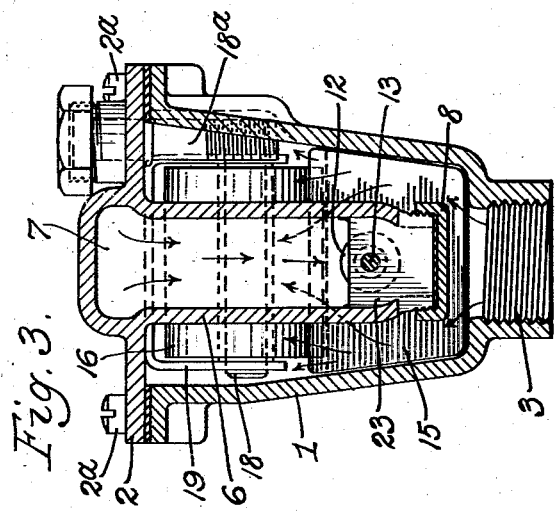
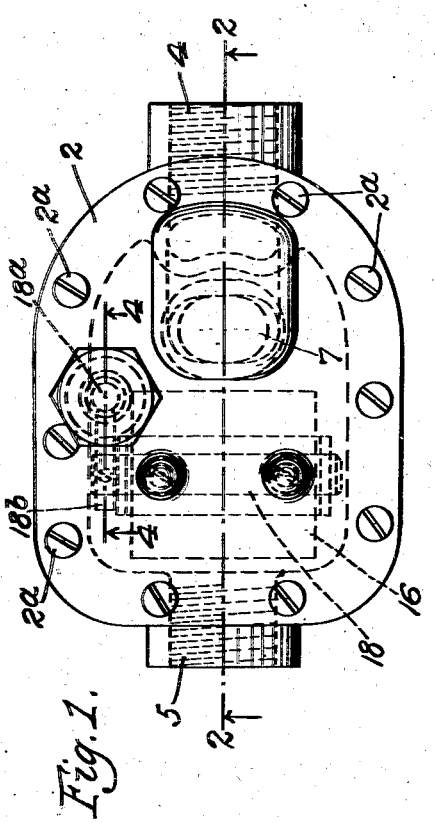
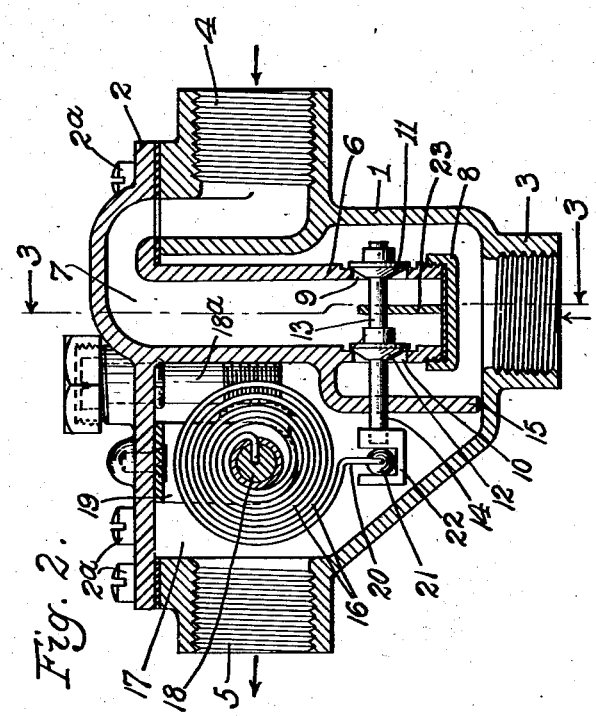
Inventor.
James K. Lund.
by Parker & Carter
Attorneys.

Patented May 18, 1943

2,319,418

UNITED STATES PATENT OFFICE 2,319,418

MIXING DEVICE FOR MIXING HOT AND COLD LIQUIDS

James K. Lund, Oak Park, Ill., assignor to The Dole Valve Company, Chicago, Ill., a corporation of Illinois Application July 8, 1939, Serial No. 283,447

5 Claims. (Cl. 236—12)

This invention relates to a mixing device for mixing hot and cold liquids and has for its object to provide a new and improved device of this description.

The invention has as a further object to provide a mixing device for hot and cold liquids by means of which the controlling mechanism for controlling the amount of hot and cold liquid is easily accessible for repairs or replacements.

The invention has as a further object to provide a mixing device for mixing hot and cold liquids wherein there is a casing containing the control mechanism, the control mechanism being attached to a cover so as to be removable with the cover, so that it can be easily repaired or replaced.

The invention has as a further object to provide a mixing device particularly adapted to be used in connection with storage tanks of hot water in homes or apartments, the mixing device being connected with the storage tank of hot water and a source of cold water and delivering mixed water to the water faucets throughout the building.

The invention has further objects which are more particularly pointed out in the accompanying description.

Referring now to the drawing,

Fig. 1 is a plan view of one form of device embodying the invention;

Fig. 2 is a sectional view taken on line 2—2 of Fig. 1;

Fig. 3 is a sectional view taken on line 3—3 of Fig. 2; and

Fig. 4 is a detailed sectional view showing the adjustment construction, taken on line 4—4 of Fig. 1.

Like numerals refer to like parts throughout the several figures.

Referring now to the drawing, the mixing device comprises a casing 1 having a removable cover 2, held in place by the removable fastening devices 2a. The casing is provided with an inlet 3 for the hot water and an inlet 4 for the cold water, and an outlet 5 for the mixed hot and cold water. These connections can be reversed so that 4 will be the hot water inlet and 3 the cold water inlet, if desired, by simply reversing the action of the thermostat. Attached to the cover 2 are the water mixing and temperature controlling devices. As herein shown, these devices consist of a conduit 6 which has a communicating passageway 7 which connects with the water inlet 4. The conduit 6 is closed at the end by a removable closing piece 8 and is provided with the ports 9 and 10. Controlling these ports are the valve members 11 and 12, said valve members being connected together by the connecting member 13. This connecting member and the valve members are mounted to move back and fourth, to open or close the ports 9 and 10. The connecting member 13 has a projecting end piece 14 which projects through the partition 15 and to which is connected the end of a thermostat 16. This thermostat is located in the chamber 17 through which the mixed hot and cold water passes, and has one end connected to a part 18 which is connected with the support 19 connected to the cover 2 and which is capable of being adjusted to adjust the thermostat to vary the temperature of the mixed water as desired.

The thermostat is adjusted by rotating the part 18 to tighten or loosen the coil of the thermostat. This adjustment is accomplished by means of an adjusting screw 18a, accessible from the exterior of the casing, which engages threads on a member 18b attached to the part 18. It will be seen that if the screw is turned in one direction, it will move the member 18b so as to move the part 18 to tighten the coil of the thermostat, and when the screw is moved in the opposite direction, the part 18 will be moved to loosen the coil of the thermostat.

The thermostat 16 has its end 20 connected with the projection 14 of the connecting member 13 for the valve members 11 and 12. This connection is preferably made by providing a ball 21 which fits into a recessed member 22 on the end of the end piece 14 of the connecting member 13. This connecting member, including the end piece 14, is mounted in the partition 15 and the supporting member 23.

The use and operation of my invention are as follows.

When the parts are made up, the conduit 6, valve members 11 and 12, thermostat 16 and associated parts, including the adjusting screw 18a, are all mounted on the cover 2, a portion of conduit 6 being formed in the cover and arranged to connect with the inlet 4 for the cold water. The parts are assembled by placing the cover in position and fastening it in position by the fastening devices 2a. The thermostat is adjusted to secure the desired temperature of the mixed water. If the device is to be used in connection with a hot water storage tank, the inlet 3 is connected with this hot water storage tank and the inlet 4 is connected with a source of cold water. The outlet 5 is connected to a pipe leading to the point of use of the mixed water. In such a construction, the temperature of the water in the hot water storage tank is comparatively high and this hot water must be delivered to the appliances or fixtures in the building at the desired temperature, which must be lower than the temperature of the water in the hot water storage tank. The thermostat 16 is adjusted to secure the desired temperature of the mixed water. When the delivery valve of any of the fixtures using this mixed water, is opened, hot water enters the inlet 3 and cold water enters the inlet 4. The cold water then passes through the ports 9 and 10 controlled by the valve members 11 and 12, mixes with the hot water, and the hot and cold water then enters the chamber 17 so as to surround the thermostat 16 and pass out of the outlet opening 5 to the point of use. If the mixed water is too cold, the thermostat acts to partially close the valve members 11 and 12 so as to admit less cold water, so that the temperature will be raised the proper amount. If the temperature of the mixed water is too hot, the thermostat moves the valve members 11 and 12 to open the ports 9 and 10 more widely, so as to admit more cold water so as to bring the temperature down to the temperature for which the device is set.

If it is desired to inspect or repair or change any of the water controlling parts, the cover 2 is removed, carrying with it all of these parts, so that they can be easily inspected and repaired or changed, or a new cover placed in position with new water mixing and temperature controlling devices thereon, if desired. By having these water mixing and temperature controlling devices attached to the cover 2, the manufacture and assembly of the parts are greatly facilitated. The attachment of the water controlling parts to the cover also permits their removal and inspection and replacement without disturbing the pipe connections to the mixing valve.

I claim:

1. A mixing device for mixing hot and cold liquids, comprising a casing having an inlet for the hot liquid and an inlet for the cold liquid and an outlet for the mixed liquid, all formed in the casing, a cover separate from said inlets and outlet for said casing, a conduit formed in said cover as a part thereof, having a discharge end projecting into the casing and an inlet communicating with the cold liquid inlet in the casing, the discharge end of said conduit being closed, said conduit being provided with two cold liquid discharge ports, valve members controlling said ports, a longitudinally movable connecting member connecting said valve members together, separated supporting bearings on said discharge end for said connecting member, and a thermostat carried by said cover, said thermostat having a port connected with said connecting member for said valve members so as to move them responsive to variations in temperature, to vary the proportion of hot and cold liquid entering the casing.

2. A mixing device for mixing hot and cold liquids, comprising a casing having an inlet for the hot liquid and an inlet for the cold liquid and an outlet for the mixed liquid, a cover for said casing a conduit having a straight portion and an angular connecting portion, said conduit formed in said cover as a part thereof and having a discharge end projecting into the casing and an inlet communicating with the cold liquid inlet in the casing, the discharge end of said conduit being closed, said conduit being provided with two ports, valve members controlling said ports, a longitudinally movable connecting member connecting said valve members together, separated supporting bearings on said discharge end for said connecting member, a thermostat carried by said cover, said thermostat having a port connected with said connecting member for said valve members so as to move them responsive to variations in temperature, to vary the proportion of hot and cold liquid entering the casing, and means carried and supported by said cover, for adjusting said thermostat.

3. A mixing device for mixing hot and cold liquids, comprising a casing having an inlet for the hot liquid and an inlet for the cold liquid and an outlet for the mixed liquid, a cover for said casing, a conduit connected with said cover and projecting into the casing and communicating at one end with the cold liquid inlet, the other end of said conduit being closed, said conduit being provided with two aligned opposed ports, separate aligned opposed valve members controlling said ports, a connecting member connecting said valve members together, a thermostat carried by said cover, said thermostat connected with said valve members so as to move them responsive to variations in temperature, to vary the proportion of hot and cold liquid entering the casing, and means attached to and forming a part of said cover for causing the hot and cold liquids to mix before either comes into contact with the thermostat.

4. A mixing device for mixing hot and cold liquids, comprising a casing having a freely open inlet for the hot liquid and a controlled inlet for the cold liquid and an outlet for the mixed liquid, a cover for said casing, a conduit formed in said cover as a part thereof, having a discharge end projecting into the casing and having an inlet communicating with the cold liquid inlet, the discharge end of said conduit being closed, said conduit being provided with two cold liquid discharge ports, separate aligned opposed valve members controlling said ports, a connecting member connecting said valve members together, a thermostat carried by said cover, said thermostat connected with said valve members so as to move them responsive to variations in temperature to vary the proportion of hot and cold liquid entering the casing, and a partition connected with said conduit and located between said hot liquid inlet and said thermostat.

5. A mixing device for mixing hot and cold liquids, comprising a casing having an inlet for the hot liquid and an inlet for the cold liquid and an outlet for the mixed liquid, a cover for said casing, a conduit formed in said cover as a part thereof, having a discharge end projecting into the casing and having an inlet communicating with the cold liquid inlet, the discharge end of said conduit being closed, said conduit being provided with two ports, valve members controlling said ports, a shaft extending through said conduit and connecting said valve members together, a thermostat carried by said cover, said thermostat connected with said shaft so as to move them responsive to variations in temperature, to vary the proportion of hot and cold liquid entering the casing, and a partition connected with said conduit and located between said hot liquid inlet and said thermostat, said partition acting as a support for the connecting member which connects the valve members together.

JAMES K. LUND.